United States Patent
Schmalzrieth et al.

(10) Patent No.: US 9,764,629 B2
(45) Date of Patent: Sep. 19, 2017

(54) VEHICLE BODY STRUCTURE FOR A TWO-TRACK VEHICLE

(71) Applicant: AUDI AG, Ingolstadt (DE)

(72) Inventors: Sven Schmalzrieth, Manching (DE); Vladimir Idelevitch, Nürnberg (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 15/409,023

(22) Filed: Jan. 18, 2017

(65) Prior Publication Data
US 2017/0210218 A1    Jul. 27, 2017

(30) Foreign Application Priority Data
Jan. 22, 2016    (DE) .................. 10 2016 000 669

(51) Int. Cl.
| | |
|---|---|
| *B60K 1/04* | (2006.01) |
| *B62D 21/15* | (2006.01) |
| *F16F 15/08* | (2006.01) |
| *F16F 15/023* | (2006.01) |

(52) U.S. Cl.
CPC .............. *B60K 1/04* (2013.01); *B62D 21/155* (2013.01); *F16F 15/023* (2013.01); *F16F 15/08* (2013.01); *B60K 2001/0416* (2013.01); *B60Y 2304/07* (2013.01); *B60Y 2306/01* (2013.01); *F16F 2230/0005* (2013.01)

(58) Field of Classification Search
CPC ................................. B60K 1/04; B62D 21/155
See application file for complete search history.

(56) References Cited

U.S. PATENT DOCUMENTS

| | | | |
|---|---|---|---|
| 2013/0240273 A1* | 9/2013 | Langer ................. | B60K 1/00 180/55 |
| 2016/0083012 A1* | 3/2016 | Stenzenberger ......... | B60K 1/04 180/62 |

FOREIGN PATENT DOCUMENTS

| | | |
|---|---|---|
| WO | WO2012/065787 A1 | 5/2012 |
| WO | WO2014/195104 A1 | 12/2014 |

* cited by examiner

*Primary Examiner* — John Walters
*Assistant Examiner* — James Triggs
(74) *Attorney, Agent, or Firm* — Henry M. Feiereisen LLC

(57) ABSTRACT

A vehicle body structure for a two-track vehicle, includes a first bearing component formed on a housing of a traction battery of the two-track vehicle, said traction battery being arranged in longitudinal direction of the two-track vehicle anterior of an auxiliary frame of a rear axle of the two-track vehicle; a second bearing component engaging in or about the first bearing component, said second bearing component extending at least one lateral longitudinal member of the auxiliary frame frontward in the longitudinal direction; and a vibration damping unit arranged between the first bearing component and the second bearing component, with the first bearing component, the second bearing component and the vibration damping unit together forming a front bearing of the auxiliary frame which connects the auxiliary frame to a body of the two-track vehicle.

16 Claims, 3 Drawing Sheets

VEHICLE BODY STRUCTURE FOR A TWO-TRACK VEHICLE

CROSS-REFERENCES TO RELATED APPLICATIONS

This application claims the priority of German Patent Application, Serial No. 10 2016 000 669.2, filed Jan. 22, 2016, pursuant to 35 U.S.C. 119(a)-(d), the content of which is incorporated herein by reference in its entirety as if fully set forth herein.

BACKGROUND OF THE INVENTION

The invention relates to a vehicle body structure for a two-track vehicle.

The following discussion of related art is provided to assist the reader in understanding the advantages of the invention, and is not to be construed as an admission that this related art is prior art to this invention.

In an electrically driven vehicle the rear wheels can be driven by means of at least one electric machine. The electric machine can be supported by a rear axle bracket or a rear-side auxiliary frame to the sides of which the wheel control arms of a wheel suspension for the rear wheels are articulately connected. The traction battery for supplying the electric machine with current can be mounted in the vehicle in driving direction anterior to the rear-side auxiliary frame. For optimally utilizing mounting space it is preferred when the traction battery borders the axle carrier as closely as possible.

It would be desirable and advantageous to provide a vehicle body structure for a two-track vehicle in which the crash sensitive traction battery can be protected against rear crash related damage in a simple manner.

SUMMARY OF THE INVENTION

According to one aspect of the present invention a vehicle body structure for a two-track vehicle includes a first bearing component formed on a housing of a traction battery of the two-track vehicle, said traction battery being arranged in longitudinal direction of the two-track vehicle anterior of an auxiliary frame of a rear axle of the two-track vehicle; a second bearing component connected with the first bearing component, said second bearing component extending at least one lateral longitudinal member of the auxiliary frame frontward in the longitudinal direction; and a vibration damping unit arranged between the first and the second bearing component, wherein the first bearing component, the second bearing component and the vibration damping unit together form a front bearing of the auxiliary frame which connects the auxiliary frame to a body of the two-track vehicle, with one of the first and second bearing component forming a bearing receptacle of the front bearing and another one of the first and second bearing component forming a core of the front bearing received in the bearing receptacle.

The vehicle body structure according to the invention provides a connection of the auxiliary frame to the vehicle body or the traction battery via an auxiliary frame bearing with a connection geometry which is significantly simpler compared to the state of the art.

According to another advantageous feature of the invention, the second bearing component can be the bearing receptacle and the first bearing component the bearing core received in the bearing receptacle or the first bearing component can be the bearing receptacle and the second bearing component the bearing core received in the bearing receptacle.

According to another advantageous feature of the invention, the bearing receptacle of the battery housing can be formed in a housing section of the traction battery. The housing section of the traction battery is preferably not vibration-decoupled (or vibration damped) but is rather rigidly connected on the vehicle body. The traction battery thus becomes the supporting stiffening part of the vehicle body structure.

According to another advantageous feature of the invention, the vibration-damping unit can be made of an elastomer body or of hydraulically interconnected working and compensation chambers. In a constructively simple embodiment the vibration-damping unit of the front auxiliary frame bearing can be brought in direct contact radially outwardly with the inner circumference of bearing receptacle of the battery housing. As an alternative the auxiliary frame bearing can additionally have a radially outer bearing sleeve. In this case the auxiliary frame bearing is of conventional construction and can for example be pressed into the bearing receptacle (bearing eye) on the battery housing with its radially outer bearing sleeve umfangsseitig.

In a currently preferred embodiment which provides for a simple axle preassembly, the bearing receptacle on the battery housing is not configured one-part but rather multi-part i.e., preferably with a bearing shell on the housing and a bearing shell, for example a fastening clamp, that can be detachably mounted on the battery housing. It is advantageous for mounting purposes when the bearing shell on the battery housing is open towards the bottom in vertical direction of the vehicle. Such an embodiment is advantageous for preassembly, i.e., when mounting the auxiliary frame in vehicle vertical direction upwards on the vehicle bottom. In this case the bearing core of the auxiliary frame can be inserted during axle preassembly into the still open bearing shell on the battery housing. Subsequently the bearing receptacle is closed by means of the above-mentioned fastening clamp. Preferably the front auxiliary frame bearing is configured as a slot bearing. In this case the front auxiliary frame bearing can during the mounting of the bearing shell (for example the fastening clamp) be radially pre-tensioned, which has a positive effect on the service life.

As mentioned above the bearing core of the front bearing of the auxiliary frame can be formed by a frontward extension of the at least one auxiliary frame longitudinal member. The bearing core can have a greater or smaller cross section compared to the front ends of the longitudinal member. Preferably the respective auxiliary frame longitudinal member can be made of a closed IHU profile, which makes it possible to form the bearing core in a simple manner of the same material as and one-piece with the auxiliary frame longitudinal member (for example by vulcanizing).

The bearing core formed on the respective auxiliary frame longitudinal member and the bearing receptacle on the battery housing are preferably configured rotation symmetric with respect to a bearing axle and are arranged coaxial to each other. The bearing axle of the thusly-formed front auxiliary frame bearing is therefore oriented so as to align with the vehicle longitudinal direction.

In order to avoid damage to the traction battery in the event of a rear impact a deformation structure can be provided in the interior of the battery housing section. In the event of a rear crash this deformation structure interacts with the front ends of the auxiliary frame longitudinal members or with the bearing cores of the auxiliary frame longitudinal bearings formed thereon and is plastically deformed. The parts therefore immediately block and are not accelerated relative to each other.

For further increasing crash safety the auxiliary frame can be provided with at least one deformation element at the front side in vehicle longitudinal direction. The deformation element can be arranged in a mounting space in vehicle longitudinal direction between the auxiliary frame and the traction battery. The deformation element has the following effect in the event of a crash: in the event of a crash a crash-related displacement of the auxiliary frame frontwards may occur. As a result the deformation element can come into contact with the traction battery and become deformed while absorbing crash energy between the auxiliary frame and the traction battery. This at least partially effectively prevents a conduction of crash energy in the direction of the traction battery, which reduces the risk of crash related damage to the traction battery.

As mentioned above the front auxiliary frame bearings can mounted in the bearing receptacles on the battery housing. This correspondingly simplifies the front auxiliary frame geometry because front bearing receptacles on the auxiliary frame, which are usually formed on the auxiliary frame as bearing eyes, are not required.

In contrast the rear auxiliary frame bearings can respectively be pressed into rear bearing receptacles, which are formed directly on the auxiliary frame as bearing eyes. As is common each of the rear auxiliary frame bearings can be pressed into an inner bearing core, which is rigidly screwed to the vehicle body, and can have a vibration-damping unit, which is arranged between the inner bearing core and the outer bearing sleeve. The bearing sleeve and the bearing core are configured rotation symmetric and are arranged coaxial relative to each other with respect to a bearing axis. The bearing axis of the rear auxiliary frame bearing is oriented so as to be aligned with the vehicle vertical direction.

According to another advantageous feature of the invention, the auxiliary frame can be fastened in a four-point support on the vehicle body. In this case the two rear auxiliary frame bearings can be arranged with a bearing axis which is oriented in the vehicle vertical direction and the two front auxiliary frame bearings can be arranged with a bearing axis, which is oriented in the vehicle longitudinal direction, which results in greater degrees of freedom in the support of the auxiliary frame on the vehicle body, i.e., compared to an auxiliary frame whose auxiliary frame bearings all have bearing axles that are axially parallel relative to each other.

In order to facilitate understanding of the above aspects of the invention these aspects are described by way of a special exemplary embodiment in which the auxiliary frame longitudinal member is extended with the bearing core and the bearing core (as an inner bearing component) is mounted in a bearing receptacle (as an outer bearing component) on the battery housing. It is understood however that the invention is not limited to this exemplary embodiment. Instead—in an inverse arrangement—the auxiliary frame longitudinal member may not be extended with the bearing core (i.e., the inner bearing component), but with the bearing receptacle (as outer bearing component. In this case the bearing receptacle is a bearing component in the auxiliary frame and the bearing core is a bearing component on the battery housing.

In the context of the present application the terms bearing component on the auxiliary frame and bearing component on the battery housing mean that in a still unassembled front auxiliary frame bearing the bearing components on the auxiliary frame are for connected with the auxiliary frame and are for example made of the same material as and/or one-piece with the auxiliary frame longitudinal members. On the other hand the bearing component on the battery housing is connected with the housing section of the traction battery and is for made of the same material as and/or one-piece with a housing section of the traction battery. In the unassembled state the inner and outer bearing components of the front auxiliary frame bearing are thus still separate from each other. The assembly of the bearing components on the auxiliary frame with the bearing component on the battery housing takes place only upon mounting the auxiliary frame on the vehicle body structure.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
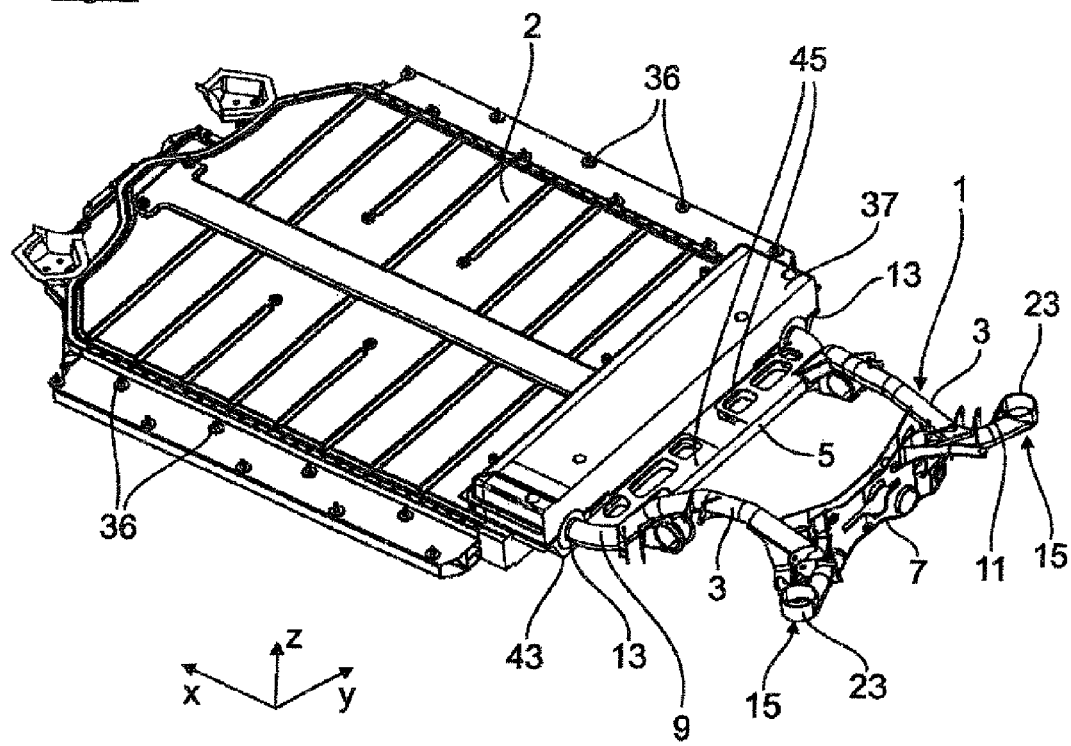
FIG. 1 shows a perspective view of rear side auxiliary frame with a traction battery situated in vehicle longitudinal direction anterior to the auxiliary frame.
Figure 2:
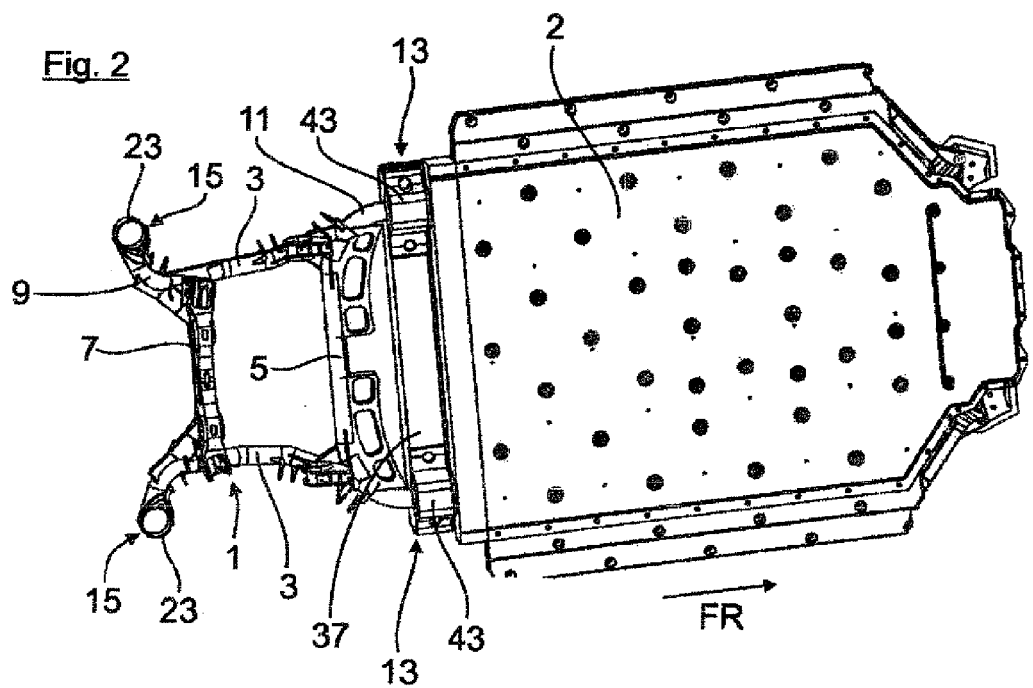
FIG. 2 shows the arrangement of FIG. 2 in a view from below.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 3:
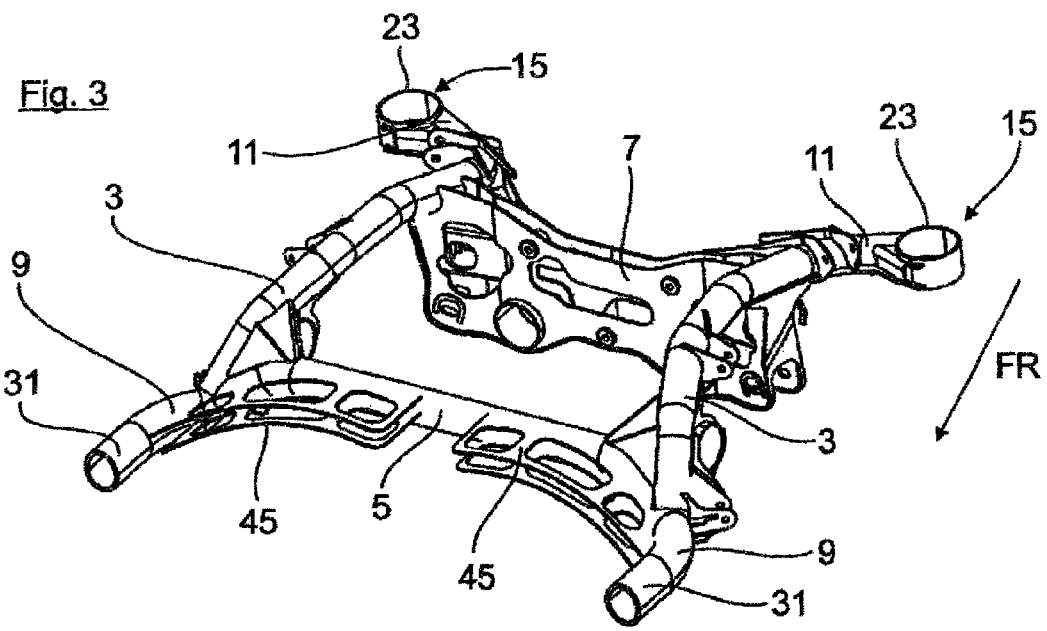
FIG. 3 shows a perspective view of the rear side auxiliary frame by itself.
Figure 4:
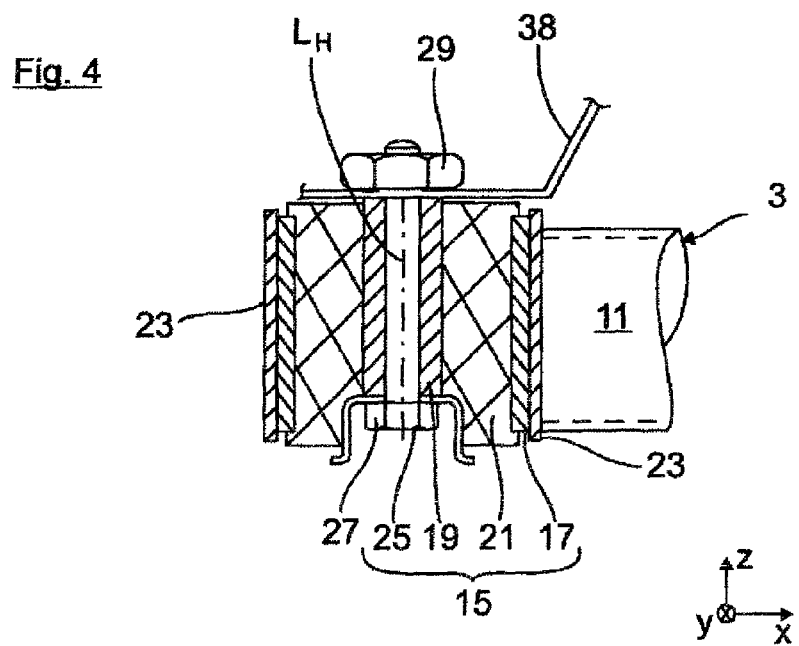
FIG. 4 shows a rear auxiliary frame bearing in a sectional view.

FIG. 1 shows a perspective view of an arrangement composed of a rear side auxiliary frame 1 for a vehicle rear axle and a traction battery 2 which is arranged in vehicle longitudinal direction x in front of the auxiliary frame and can be mounted in an eclectically driven motor vehicle. The auxiliary frame 1 in FIG. 1 is constructed as a closed frame, i.e., with auxiliary frame longitudinal members 3, which are spaced apart in vehicle transverse direction y, and with front and rear cross members 5, 7. The cross members extend in vehicle transverse direction y and connect the two auxiliary frame longitudinal members 3 on front and rear corner-joints. The two auxiliary frame longitudinal members 3 are extended frontwards and rearwards in vehicle longitudinal direction respectively beyond the corner-joints with longitudinal member front segments 9 and longitudinal member rear segments 11 (FIG. 3).

The auxiliary frame 1 is connected in a four-point support on the vehicle body 38 (FIG. 5 or 6) via front auxiliary bearings 13 (FIG. 1, 2, 6) and via rear auxiliary frame bearings 15 (FIG. 1, 2, 3, 4). The front and rear auxiliary frame bearings 13, 15 are respectively positioned on the longitudinal member front segments 9 and on the longitudinal member rear segments 11. The front and rear auxiliary frame bearings 13, 15 are hereby not of identical construction but are rather configured differently: According to FIG. 4 the rear auxiliary frame bearing 15 has a radially outer bearing sleeve 17 and a radially inner bearing sleeve 19. Between the two bearing sleeves 17, 19 an elastomer body 21 is vulcanized. The outer bearing sleeve 17 of the rear auxiliary frame bearing 15 is pressed into a bearing receptacle 23, which is formed on the respective longitudinal member rear segment 11. Through the inner sleeve 19 a threaded bolt 25 is guided by means of which the inner bearing sleeve 19 is rigidly clamped between its bolt head 27 and an inner threading section 29 of the vehicle body 38. The outer and inner bearing sleeve 17, 19 and the threaded bolt 25 are oriented coaxial relative to each other and are situated on a bearing axis LH, which extends in alignment with the vehicle vertical direction z.

On the other hand the longitudinal member front segments 9 are formed without such a bearing receptacle 23. Rather the longitudinal member front segments 9 are extended frontward in vehicle longitudinal direction x with a bearing core 31, which is a part of the front auxiliary frame bearing 13. As can be seen from FIG. 6 the bearing core 33 is mounted elastically resilient under pre-tension in a bearing receptacle 35 (FIG. 5) on the battery housing with interposition of an annular elastomer body 33. The bearing receptacle 35 is formed in a housing section 37 of the traction battery 2. In its interior also mechanical or electrical components of the traction battery 2 and/or a deformation structure can be arranged, which in the event of a rear crash interacts with the auxiliary frame longitudinal member 3 and plastically deforms.

Figure 5:
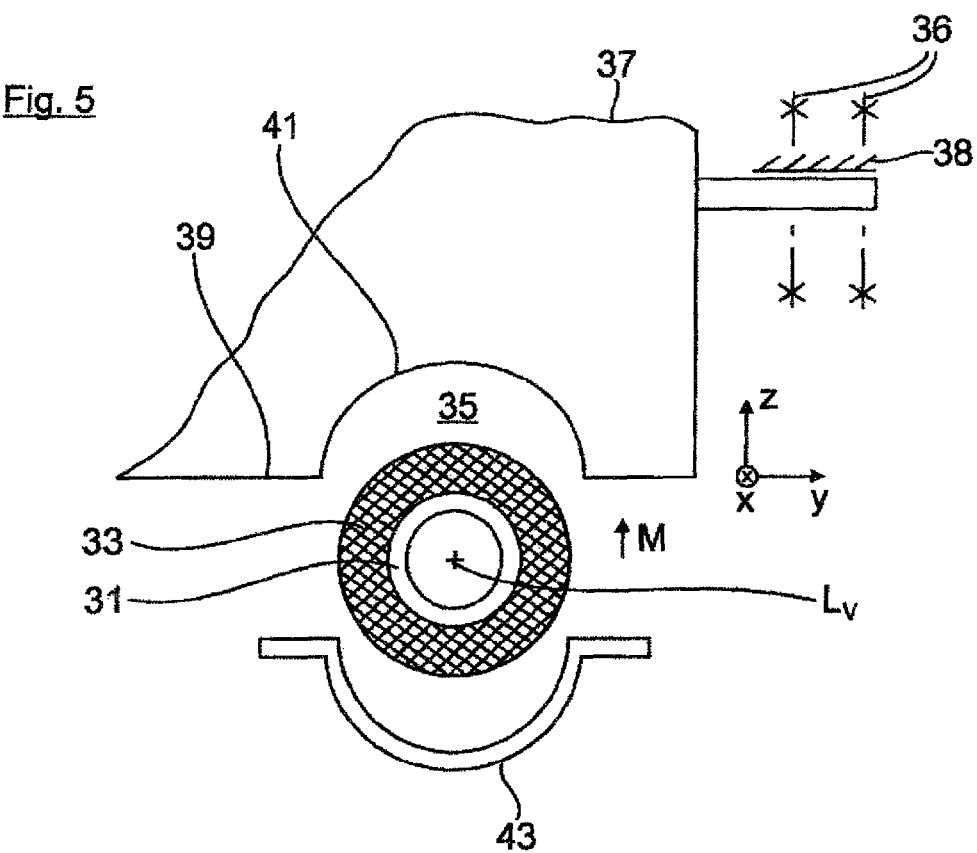
FIG. 5 shows a view illustrating a step during axle preassembly.

As can be further seen from FIG. 5 the bearing receptacle 35 is formed on the outside of the floor wall 39 of the housing section 37. According to FIG. 5 or 6 the bearing receptacle 35 has a bearing shell 41, which is formed in the floor wall 39 of the housing section 37 and together with a fastening clamp 43 defines the bearing receptacle 35. The fastening clamp 43 can be screwed to the floor wall 39 at screw points 45 (FIG. 6) and forms a detachable bearing shell of the front auxiliary frame bearing 13. According to FIG. 6 the bearing core 31 and the radially outer bearing receptacle 35 are oriented rotation symmetric with respect to a bearing axis $L_V$ (FIG. 5 or 6) and the bearing core 31 and the radially outer bearing receptacle 35 are situated on the common bearing axis $L_V$ coaxial to each other. In contrast to the rear auxiliary frame bearings 15 the bearing axis $L_V$ of the front auxiliary frame bearing 13 is not oriented in vehicle vertical direction z but is oriented in alignment with the vehicle longitudinal direction x.

As can be further seen from FIG. 3 the two longitudinal member front segments 9 together with the front cross member 5 delimit a mounting space in which deformation elements 45 are formed on a front side of the front cross member 5. The two deformation elements 45 are arranged in vehicle longitudinal direction x (or in driving direction FR) between the auxiliary frame 1 and the traction battery 2. By means of the traction battery 2 a not shown electric machine is supplied with electrical energy, which electric machine can be positioned in vehicle longitudinal direction x between the front and rear cross members 5, 7 of the auxiliary frame 1 and is drivingly connected with the two rear wheels of the vehicle via output shafts.

During normal driving operation the two deformation elements 45 are spaced apart from the traction battery 25 via a free space. In the event of a rear crash the auxiliary frame 1 may detach from the vehicle body structure in response to a sufficiently high crash energy and become displaced in vehicle longitudinal direction x frontward in the direction toward the traction battery 2. In this case the deformation elements 45 between the traction battery 2 and the auxiliary frame 1 are deformed, whereby the impact forces conducted into the traction battery 2 can be reduced. In addition also the deformation structure arranged n the interior of the battery housing section 37 is deformed, thereby further decreasing the crash energy.

Figure 6:
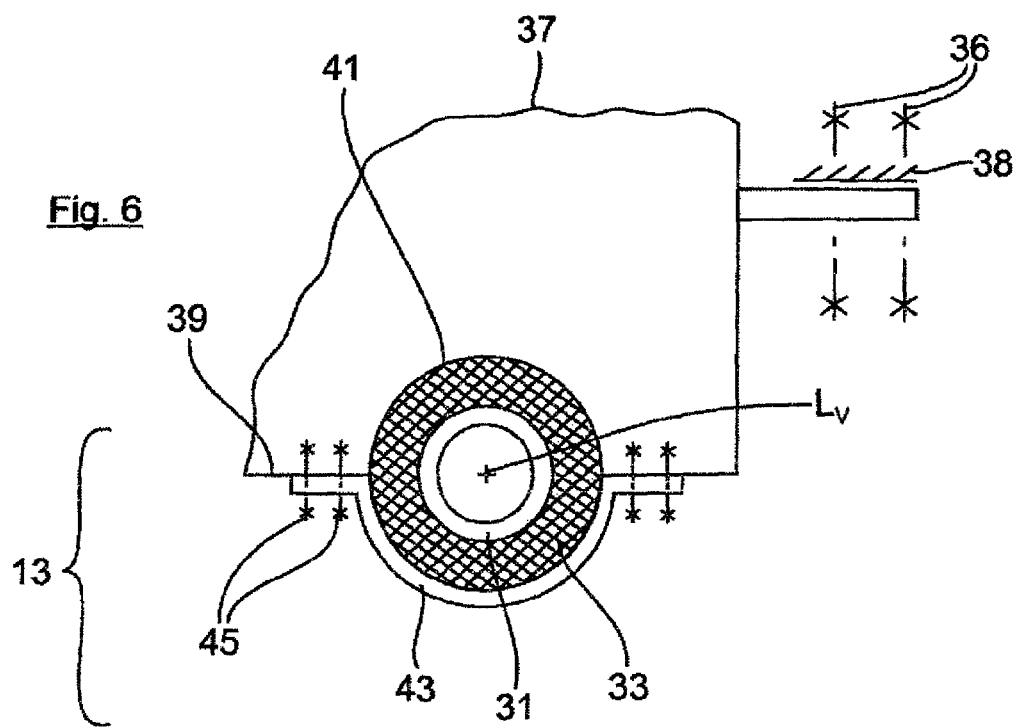
FIG. 6 shows a view illustrating another step during axle preassembly.

In the following an axle assembly M is described by way of FIGS. 5 and 6 in which the traction battery 2 is already mounted on the vehicle body 38 via the connection points 36 and the auxiliary frame 1 can be mounted in vehicle vertical direction z upwards on the vehicle body 38. In the axle assembly M the bearing core 31 of the front auxiliary bearing 13 on the auxiliary frame is automatically inserted into the still open bearing shell 41 on the battery housing. Subsequently according to FIG. 6 the fastening clamp 43 is mounted, whereby the bearing receptacle 35 is closed.

What is claimed as new and desired to be protected by Letters Patent is set forth in the appended claims and includes equivalents of the elements recited therein:

What is claimed is:

1. A vehicle body structure for a two-track vehicle, comprising:
    a first bearing component formed on a housing of a traction battery of the two-track vehicle, said traction battery being arranged in longitudinal direction of the two-track vehicle anterior of an auxiliary frame of a rear axle of the two-track vehicle;
    a second bearing component connected with the first bearing component, said second bearing component extending a longitudinal extent of at least one lateral longitudinal member of the auxiliary frame frontward in the longitudinal direction; and
    a vibration damping unit arranged between the first and the second bearing component,
    wherein the first bearing component, the second bearing component and the vibration damping unit together form a front bearing of the auxiliary frame which connects the auxiliary frame to a body of the two-track vehicle, with one of the first and second bearing component forming a bearing receptacle of the front bearing and another one of the first and second bearing component forming a core of the front bearing received in the bearing receptacle.

2. The vehicle body structure of claim 1, wherein the first bearing component is formed in a housing section of the traction battery which is rigidly connected on the vehicle body via connection points.

3. The vehicle body structure of claim 1, wherein the vibration damping unit is made of an elastomer body or of hydraulically interconnected work and compensation chambers and is radially outwardly in direct contact with an inner circumference of the first bearing component.

4. The vehicle body structure of claim 1, wherein the vibration damping unit is made of an elastomer body or of hydraulically interconnected work and compensation chambers and is radially outwardly connected with the other one of the first and second bearing component via interposition of a radially outer bearing sleeve.

5. The vehicle body structure of claim 1, wherein the second bearing component is the bearing receptacle and the first bearing component is the bearing core received in the bearing receptacle.

6. The vehicle body structure of claim 1, wherein the first bearing component is the bearing receptacle and the second bearing component is the bearing core received in the bearing receptacle.

7. The vehicle body structure of claim 6, wherein the bearing receptacle comprises a first bearing shell arranged on the housing and a second bearing shell which is detachably mountable on the battery housing.

8. The vehicle body structure of claim 7, wherein the second bearing shell is constructed as a fastening clamp.

9. The vehicle body structure of claim 8, wherein the first bearing shell is downwardly open in vertical direction of the two-track vehicle so as to permit insertion of the bearing core into the open first bearing shell during mounting of the auxiliary frame in a vertical direction upwards on the vehicle body and subsequent mounting of the bearing clamp on the battery housing.

10. The vehicle body structure of claim 2, further comprising a deformation structure provided in an interior of the battery housing section, wherein in the event of a rear crash the deformation structure interacts with the longitudinal member of the auxiliary frame thereby undergoing plastic deformation.

11. The vehicle body structure of claim 1, further comprising at least one deformation element provided on a front side of the auxiliary frame, said at least one deformation element being arranged in vehicle longitudinal direction in a mounting space between the auxiliary frame and the traction battery, wherein in the event of a displacement of the auxiliary frame frontwards resulting from a rear crash, the deformation element comes into contact with the traction battery and is deformed, thereby absorbing crash energy.

12. The vehicle body structure of claim 1, further comprising a rear bearing and a rear bearing receptacle arranged on a rear side of the auxiliary frame, said rear bearing connecting the auxiliary frame on the vehicle body, said rear bearing receptacle being adapted for mounting the rear bearing therein.

13. The vehicle body structure of claim 11, wherein the rear bearing has an inner bearing core rigidly screwed with the vehicle body, an outer bearing sleeve rigidly inserted into the rear bearing receptacle of the auxiliary frame, and another vibration damping unit arranged between the inner bearing core and the outer bearing sleeve.

14. The vehicle body structure of claim 1, wherein the auxiliary frame is fastened via a four point support on the vehicle body.

15. The vehicle body structure of claim 11, wherein a bearing axis of the rear bearing is oriented in a vehicle vertical direction and a bearing axis of the front bearing is oriented in the vehicle longitudinal direction.

16. A method for mounting an auxiliary frame on a vehicle body structure of a two-track vehicle, comprising:
arranging an auxiliary frame relative to a traction battery mounted on a body of the two-track vehicle so that a first bearing component provided on a lateral longitudinal member of the auxiliary frame and extending the longitudinal member frontward in longitudinal direction of the two-track vehicle engages with a second bearing component formed on a housing of the traction battery; and
providing a vibration damping unit between the first bearing component and the second bearing component; wherein the first bearing component, the second bearing component and the vibration damping unit together form a front bearing of the auxiliary frame which connects the auxiliary frame to a body of the two track vehicle, with one of the first and second bearing component forming a bearing receptacle of the front bearing and another one of the first and second bearing component forming a core of the front bearing received in the bearing receptacle.

* * * * *